(12) United States Patent
Chen et al.

(10) Patent No.: US 6,273,532 B1
(45) Date of Patent: Aug. 14, 2001

(54) COMPUTER ENCLOSURE INCORPORATING A LATCH

(75) Inventors: Yun-Long Chen, Chung-Ho; Yu-Tai Liu, Hsin-Chuang; Kuang-Yu Chen, Tu-Chen; Alvin Liu, Pa-Li, all of (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 09/513,229

(22) Filed: Feb. 24, 2000

(51) Int. Cl.[7] .................................................... A47B 81/00
(52) U.S. Cl. ...................... 312/223.2; 222/229; 222/129
(58) Field of Search .................. 312/222, 265.6, 312/293.3, 223.1, 223.2; 292/128, 228, 226, DIG. 11, 229, 129

(56) References Cited

U.S. PATENT DOCUMENTS 1,007,398 * 10/1911 Snider .............................. 292/129 X
3,250,558 * 5/1966 McClintock ..................... 292/229 X
3,626,730 * 12/1971 Murase ............................. 292/129 X
5,609,373 * 3/1997 Gromotka ............................ 292/229

FOREIGN PATENT DOCUMENTS

599719 * 2/1933 (DE) ................................ 292/129 X

* cited by examiner

Primary Examiner—Peter M. Cuomo
Assistant Examiner—Michael J. Fisher
(74) Attorney, Agent, or Firm—Wei Te Chung

(57) ABSTRACT

A computer enclosure comprises a chassis and a hood attached to the chassis. The chassis has a latch resiliently and pivotably attached thereto. The latch forms a protrusion and an ejector. The hood has a fixing tab defining a fixing hole for engagingly receiving the protrusion of the latch therein thereby fixing the hood to the chassis. The fixing tab forms a bent end for ejection by the ejector of the latch thereby detaching the hood from the chassis.

17 Claims, 6 Drawing Sheets

COMPUTER ENCLOSURE INCORPORATING A LATCH

BACKGROUND OF THE INVENTION

1. Field of the Invention

The present invention is related to a computer enclosure, and particularly to a computer enclosure having a latch fixed to a chassis for readily attaching/detaching a hood to/from the chassis.

2. The Related Art

Recent trends in the computer industry include using two or more subcontractors to assemble a computer. Generally, a computer enclosure is manufactured at a first site where labor cost is low, after which other components may be assembled in the computer enclosure to finalize the computer system at a second site where labor cost is high. During the procedure of assembling the computer, a hood of the computer enclosure is attached to and then detached from a chassis of the computer enclosure several times. For a conventional computer enclosure, the hood is fixed to the chassis of the computer enclosure by bolts, so the assembling/disassembling of the hood to/from the chassis is time-consuming and laborious.

To counter the above problem, a hood is attached to a chassis of a computer enclosure without bolts, as disclosed in Taiwan patent application No. 82212635. The hood of the computer enclosure forms two pairs of tabs and a pair of lips at stacked flanges on opposite sides thereof. The chassis of the computer enclosure has a pair of side flanges each defining a pair of slots for receiving the tabs of the hood. Thus, the lips of the hood abut against the side flanges of the chassis and the tabs of the hood engagingly extend through the slots of the chassis thereby fixing the hood to the chassis. However, the hood is fixed to the chassis so tightly that it requires a larger than normal force to detach the hood from the chassis. Furthermore, to apply the force to the hood is complicated. So detaching the hood from the chassis of the computer enclosure is complicated.

In another example disclosed in Taiwan patent application No. 86211252, a hood is readily attached to a chassis of a computer enclosure. A pair of actuating protrusions and two pairs of fingers respectively at opposite sides of the protrusions are formed at opposite sides of the hood. The chassis forms a pair of tabs for each pair of fingers, each pair of tabs engaging with the corresponding pair of fingers of the hood, thereby fixing the hood to the chassis. However, the hood is outwardly deformed during disengagement of the fingers from the tabs. Thus, the hood becomes deformed and no longer closely fits the chassis after being assembled and disassembled several times. The resulting gap between the hood and the chassis furthermore results in an increased EMI (electromagnetic interference) problem.

SUMMARY OF THE INVENTION

Accordingly, an object of the present invention is to provide a computer enclosure having a latch for facilitating assembling/disassembling a hood to/from a chassis of the computer enclosure.

Another object of the present invention is to provide a computer enclosure having a latch for facilitating assembling/disassembling a hood to/from a chassis which prevents the hood of the computer enclosure from being deformed, thereby conserving EMI protection offered by the hood.

To achieve the above-mentioned objects, a computer enclosure comprises a chassis and a hood attached to the chassis. The chassis has a latch resiliently and pivotably attached thereto. The latch forms a protrusion and an ejector. The hood has a fixing tab defining a fixing hole for engagingly receiving the protrusion of the latch therein thereby fixing the hood to the chassis. The fixing tab forms a bent end for ejection by the ejector of the latch thereby detaching the hood from the chassis.

BRIEF DESCRIPTION OF THE DRAWINGS

Other objects and advantages of the present invention will be understood from the following description of a computer enclosure according to the preferred embodiment of the present invention as shown in the accompanying draw in which.

DETAILED DESCRIPTION OF THE PREFERRED EMBODIMENT

Figure 1:
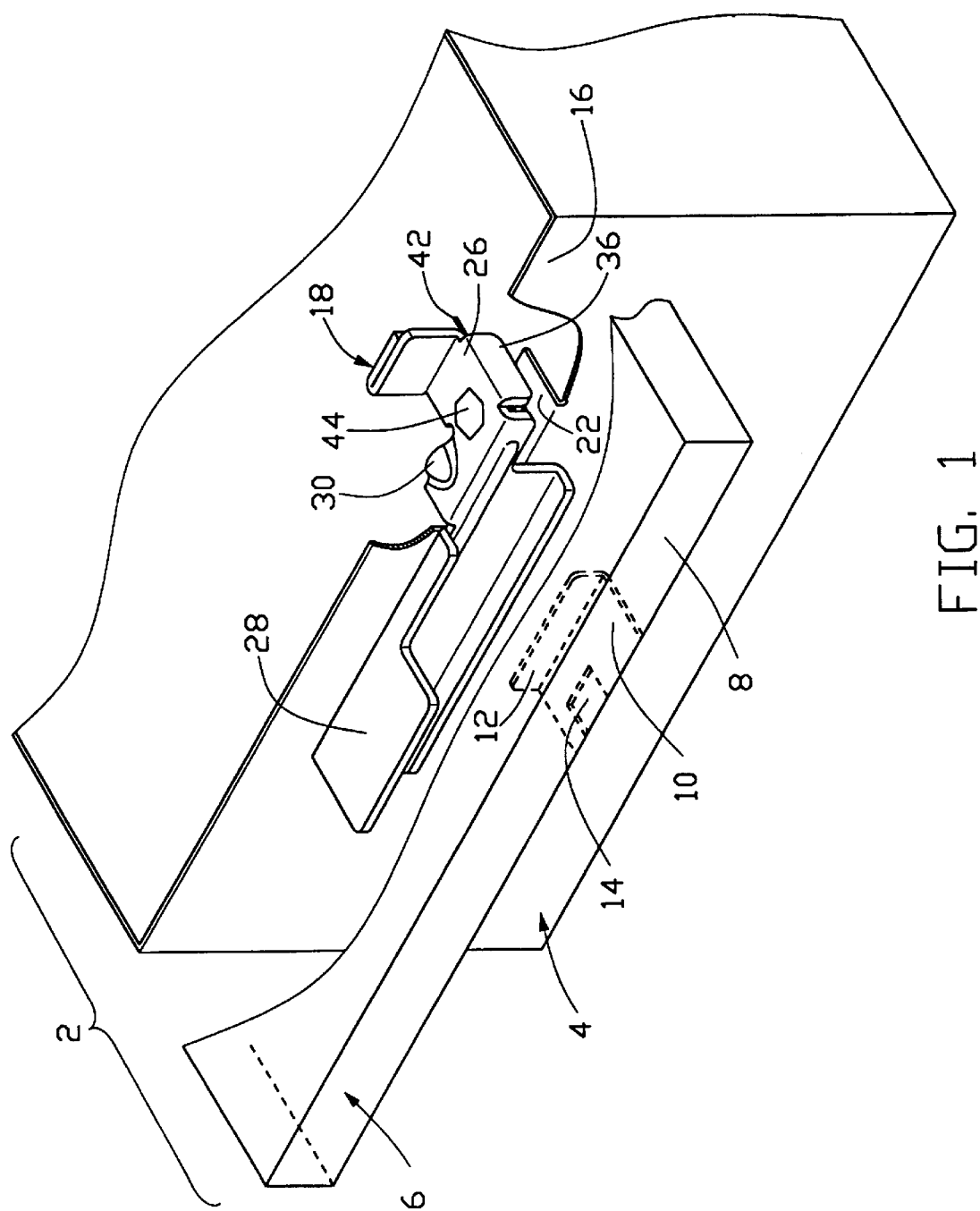
FIG. 1 is a schematic view of a computer enclosure of the present invention showing a hood and a chassis.

Referring to FIG. 1, a computer enclosure 2 of the present invention includes a chassis 4 and a hood 6 attached to the chassis 4. The hood 6 has a rear flanges 8 from which a fixing tab 10 (shown by dash line) extends. The fixing tab 10 forms a bent end 12 and defines a fixing hole 14. The chassis 4 includes a rear panel 16 and a latch 18 fixedly and pivotably attached to the rear panel 16. It should be noted that a portion of the rear panel 16 is cut away in FIG. 1 for showing the latch 18.

Figure 2:
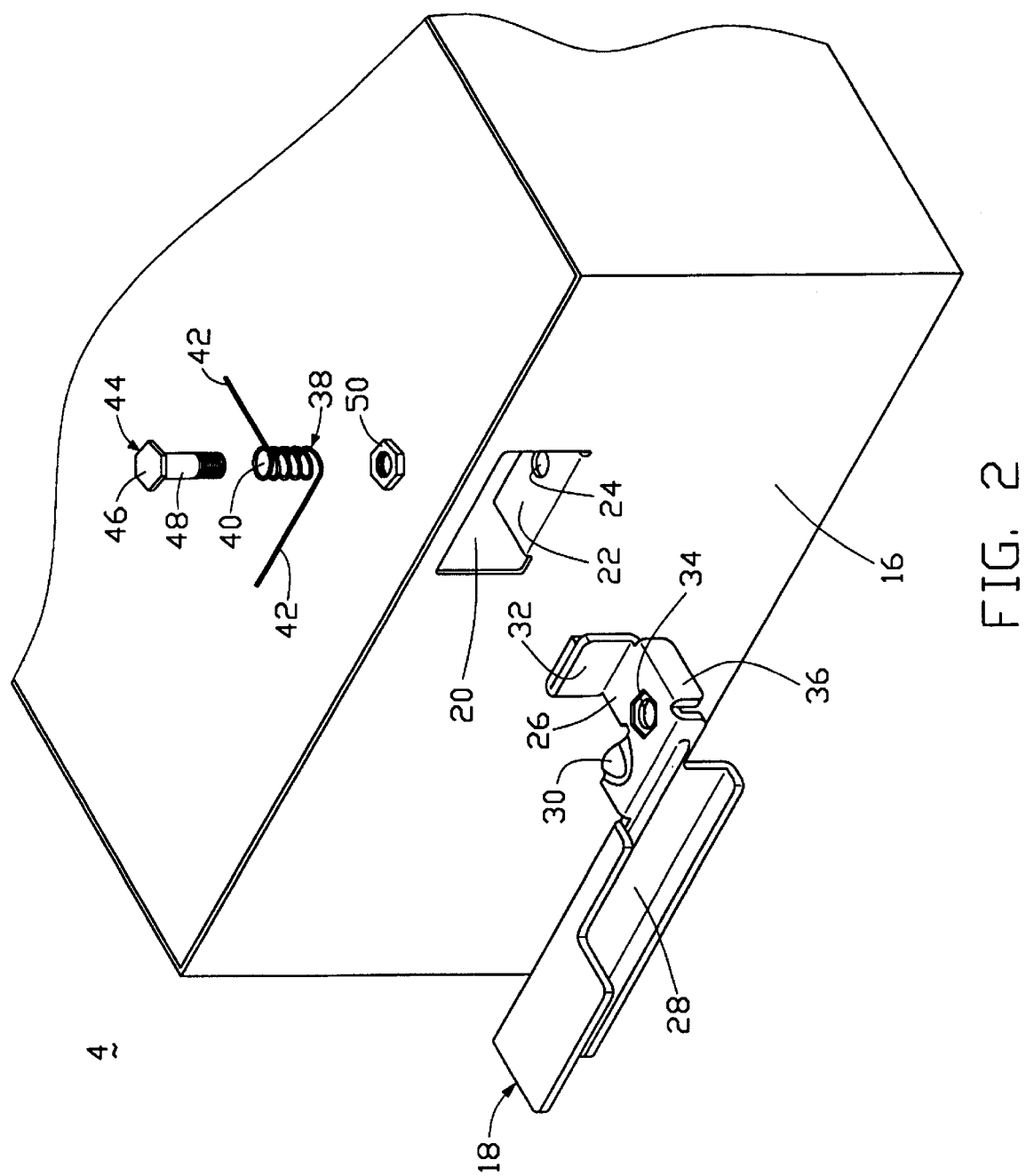
FIG. 2 is an exploded view of the chassis of FIG. 1.

Referring to FIGS. 1 and 2, the rear panel 16 of the chassis 4 defines an opening 20 and forms a supporting tab 22 extending from a bottom edge of the opening 20 for supporting the latch 18. A through hole 24 is defined in the supporting tab 22. The latch 18 includes a body 26 and an actuating arm 28 extending from the body 26. A protrusion 30 extends from the body 26 for engaging with the fixing hole 14 of the hood 4. An ejector 32 perpendicularly extends from the body 26 for pushing the bent end 12 of the hood 4. A receiving hole 34 is defined in the body 26 for aligning with the through hole 24 of the supporting tab 22. A lip 36 perpendicularly extends from the body 26 and is substantially perpendicular to the actuating arm 28 of the latch 18. A spring 38 defines a slot 40 and has two pin-shaped ends 42 for respectively abutting against the lip 36 of the body 26 and the rear panel 16 of the chassis 4. A bolt 44 has a cap 46 for being received in the receiving hole 34 of the latch 18 and a post 48 extending from the cap 46 for threadedly engaging with a nut 50.

Figure 4:
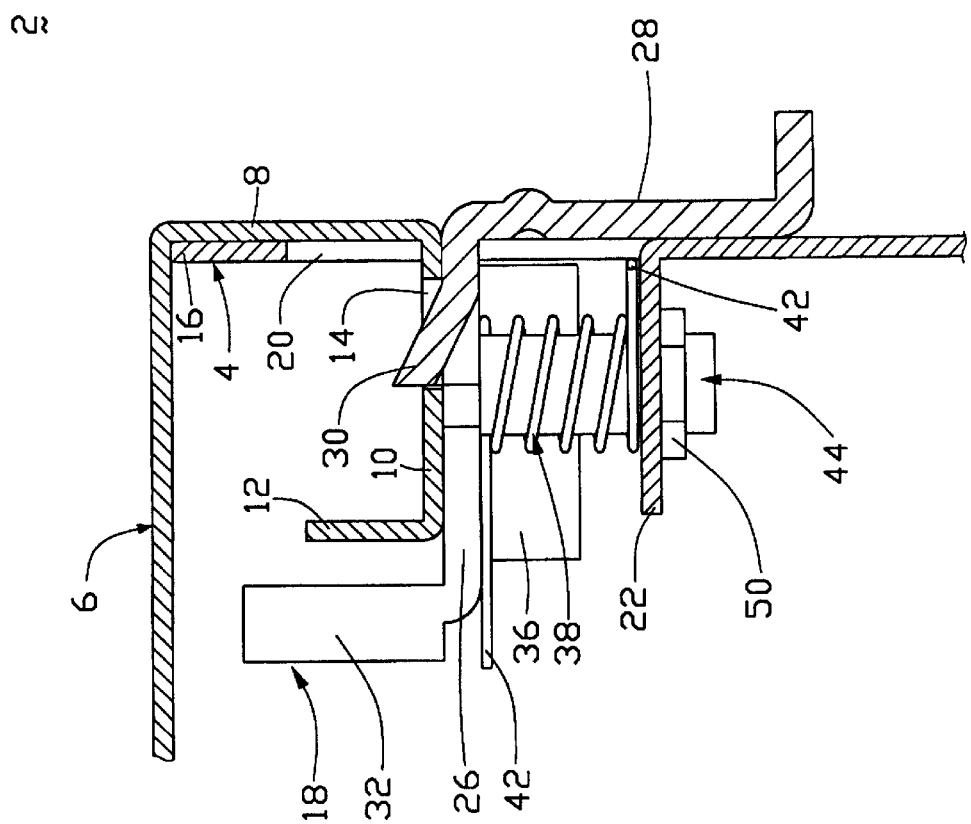
FIG. 4 is a cross-sectional view taken along line of IV—IV of FIG. 3.

Referring to FIGS. 1, 2 and 4, the body 26 of the latch 18 extends through the opening 20 of the rear panel 16 of the chassis 4. The spring 38 is secured between the body 26 and the supporting tab 22 of the rear panel 16 with both pin-shaped ends 42 respectively abutting against the lip 36 of the latch 18 and the rear panel 16 of the chassis 4. The bolt 44 extends through the receiving hole 34 of the latch 18, the slot 40 of the spring 38 and the through hole 24 of the supporting tab 22, and then threadedly engages with the nut 50. Thus, the latch 18 is fixedly and pivotably attached to the supporting tab 22 of the rear panel 16 of the chassis.

Figure 3:
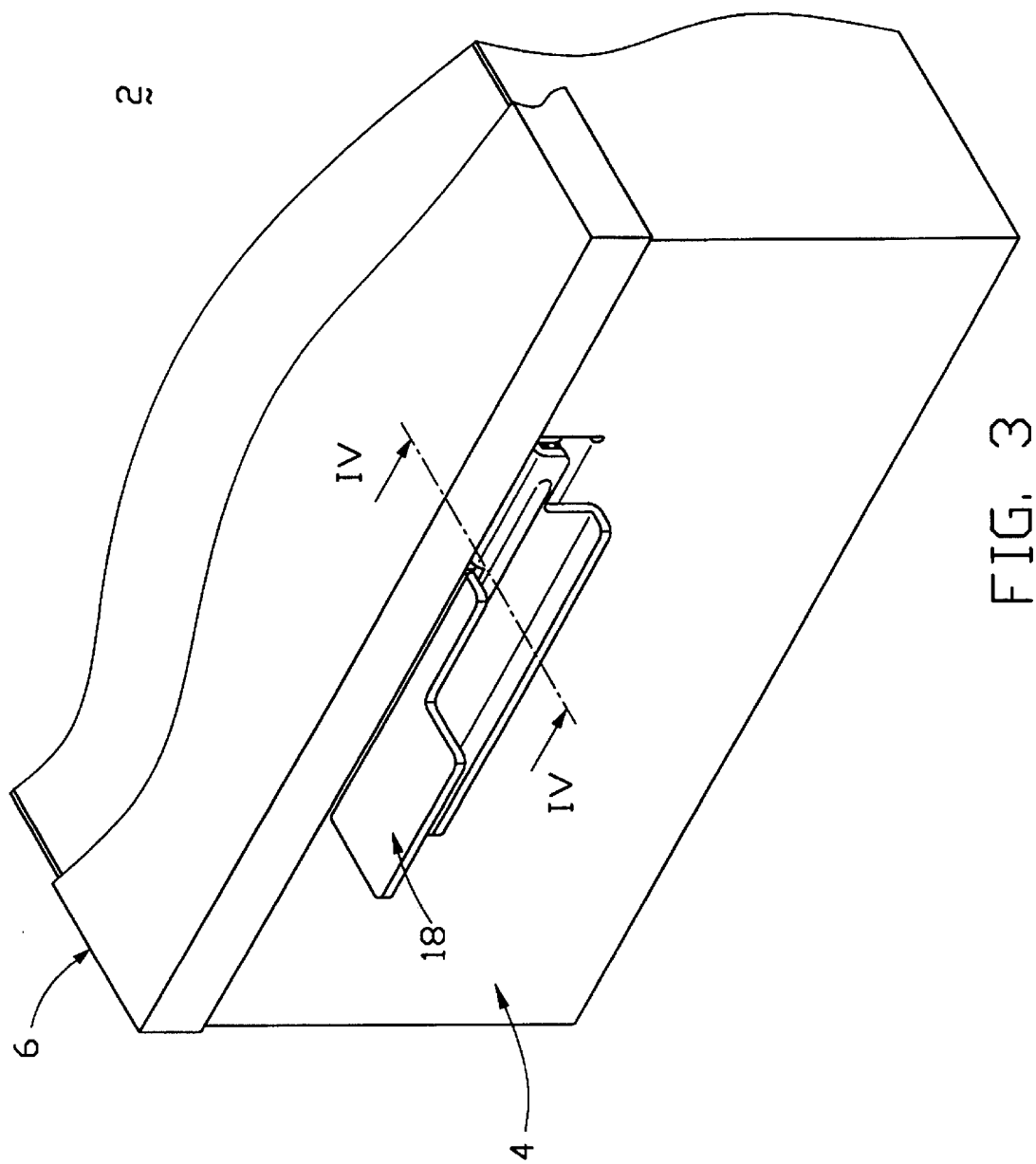
FIG. 3 is an assembled view of FIG. 1.

Referring to FIGS. 1, 3 and 4, the hood 6 is attached to the chassis 4 with the fixing tab 10 thereof extending through the opening 20 of the chassis 4. The rear flange 8 of the hood 6 closely abuts against the rear panel 16 of the chassis 4 for providing an effective EMI shield. The protrusion 30 of the latch 18 is engagingly received in the fixing hole 14 of the hood 6 to fix the hood 6 to the chassis 4. Thus, the hood 6 is readily attached to the chassis 4 of the computer enclosure 2.

Figure 5:
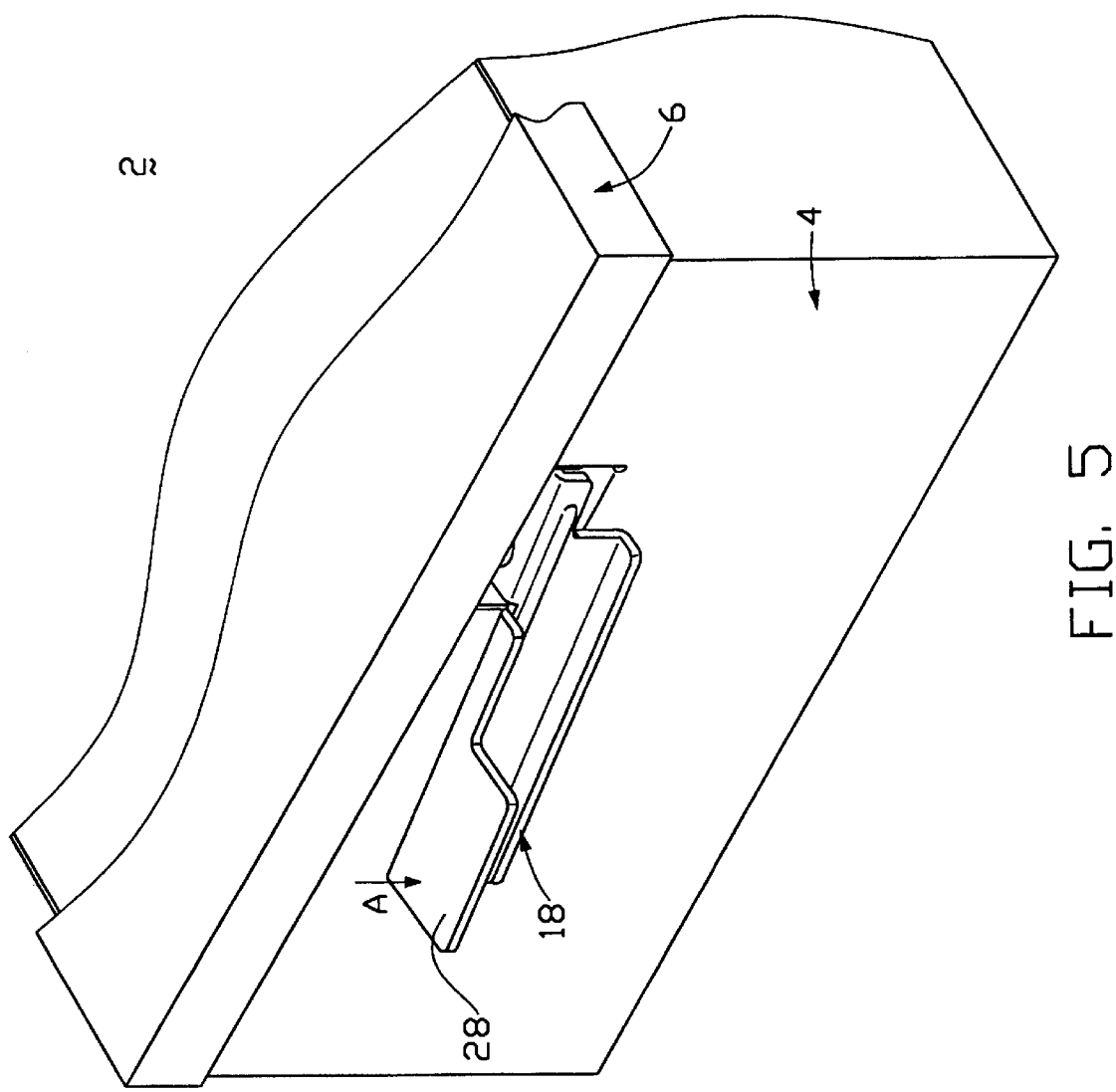
FIG. 5 is similar to FIG. 3 showing that a latch of the chassis is depressed to disengage with the hood.
Figure 6:
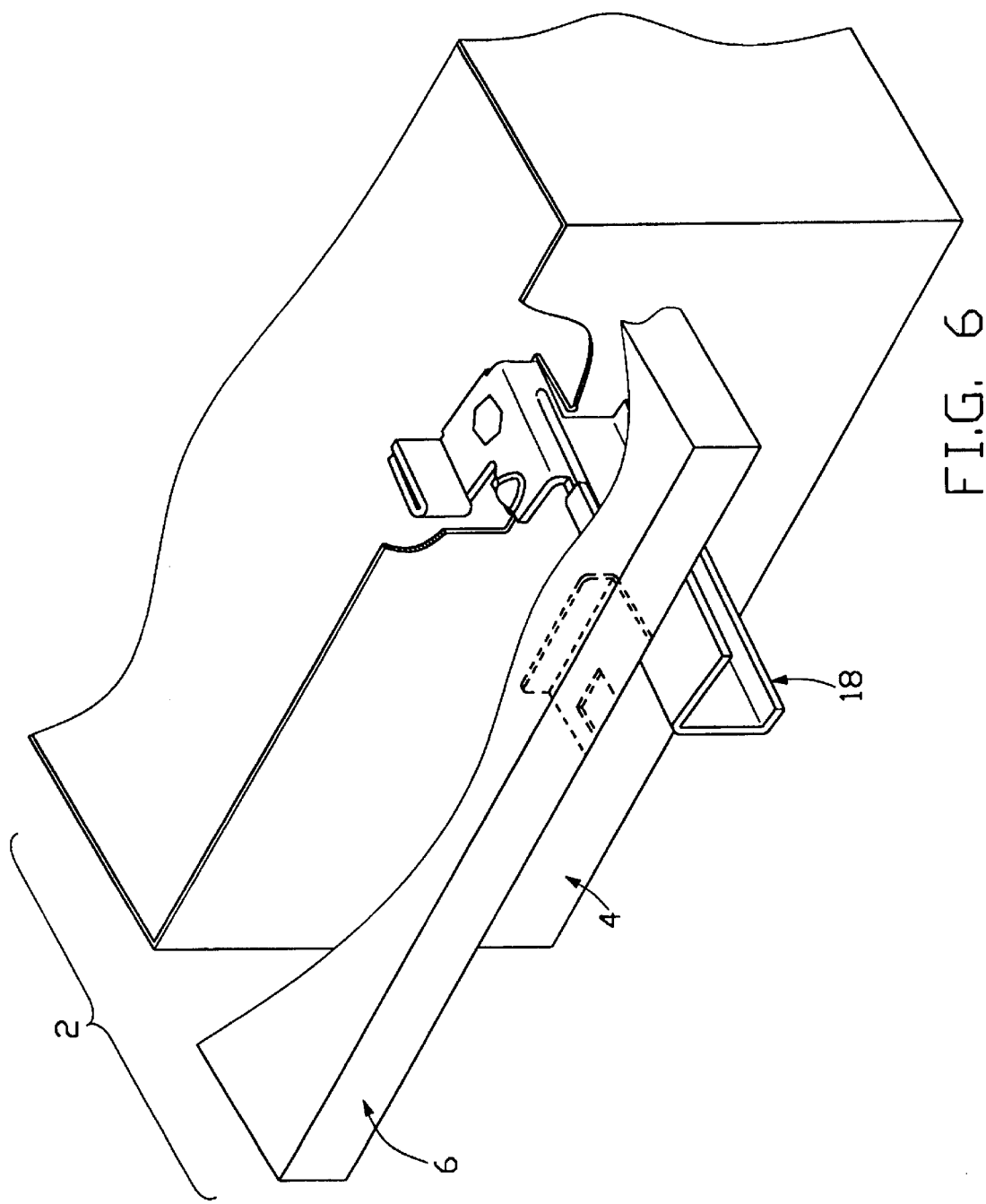
FIG. 6 is similar to FIG. 1 showing that the latch of the chassis is pivoted outward from the chassis and the hood is detached from the chassis.

Referring to FIGS. 4–6, in disassembly, the actuating arm 28 of the latch 18 is depressed along a direction A to disengage the protrusion 30 from the fixing hole 14 of the hood 6. Then the latch 18 is outwardly pivoted about the bolt 44 away from the rear panel 16 with the ejector 32 contacting and pushing the bent end 12 of the hood 6 until the fixing tab 10 of the hood 6 is moved out of the opening 20 of the chassis 4. Thus, the hood 6 is readily detached from the chassis 4.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A computer enclosure comprising:
    a chassis defining an opening and having a supporting tab, a latch extending through the opening and being pivotally attached to the supporting tab, the latch forming a protrusion; and
    a hood attached to the chassis, the hood having a fixing tab for extending through the opening of the chassis, the fixing tab defining a fixing hole for engagingly receiving the protrusion of the latch therein, thereby fixing the hood to the chassis, the hood being detached from the chassis by firstly depressing the latch and then pivoting the latch about the supporting tab in a direction away from the chassis.

2. The computer enclosure as described in claim 1, wherein the chassis includes a rear panel, and wherein the opening is defined in the rear panel and the supporting tab extends inwardly from a bottom edge of the opening.

3. The computer enclosure as described in claim 1, wherein a spring is secured between the latch and the supporting tab of the chassis.

4. The computer enclosure as described in claim 3, wherein the spring has a pair of pin-shaped ends for respectively abutting against the latch and the chassis.

5. The computer enclosure as described in claim 1, wherein the latch defines a receiving hole and the supporting tab defines a through hole, and wherein a bolt extends through the receiving hole of the latch and the through hole of the supporting tab and then threadedly engages with a nut for attaching the latch to the chassis.

6. The computer enclosure as described in claim 1, wherein the latch includes a body for extending through the opening of the chassis, an actuating arm extending from the body and positioned outside the opening, and wherein the protrusion is formed on the body of the latch.

7. A computer enclosure comprising:
    a chassis defining an opening and having a supporting tab, a latch extending through the opening and being fixedly and pivotably attached to the supporting tab, the latch forming an ejector; and
    a hood attached to the chassis and having a fixing tab to extend through the opening of the chassis for fixing the hood to the chassis, the fixing tab having a bent end for ejection by the ejector of the latch.

8. The computer enclosure as described in claim 7, wherein a spring is secured between the latch and the supporting tab of the chassis.

9. The computer enclosure as described in claim 8, wherein the latch forms a lip, and wherein the spring has a pair of pin-shaped ends for respectively abutting against the lip of the latch and a panel of the chassis.

10. The computer enclosure as described in claim 9, wherein the latch defines a receiving hole, the spring defines a slot and the supporting tab defines a through hole, and wherein a bolt extends through the receiving hole of the latch, the slot of the spring and the through hole of the supporting tab and then threadedly engages with a nut.

11. A computer enclosure comprising:
    a chassis having a latch fixedly and pivotably attached thereto, the latch forming a protrusion and an ejector; and
    a hood attached to the chassis and having a fixing tab, the fixing tab defining a fixing hole for engagingly receiving the protrusion of the latch therein thereby fixing the hood to the chassis and forming a bent end for ejection by the ejector of the latch thereby detaching the hood from the chassis.

12. The computer enclosure as described in claim 11, wherein the chassis includes a rear panel defining an opening for extension of the fixing tab of the hood and for extension of the latch.

13. The computer enclosure as described in claim 12, wherein a supporting tab extends from a bottom edge of the opening of the rear panel for supporting the latch.

14. The computer enclosure as described in claim 13, wherein a spring is secured between the latch and the supporting tab, and wherein a bolt extends through the latch, the spring and the chassis for pivotably fixing the latch to the chassis.

15. A computer enclosure comprising:
    a chassis including a panel defining an opening;
    a latch pivotally mounted unto the chassis and extending through the opening with an actuating arm exposed to an exterior outside the opening;
    a hood attached unto the chassis, said hood including a fixing tab extending into the opening; wherein
    said latch includes means for locking the hood in position with regard to the chassis when said actuating arm is positioned in a close parallel relationship with the panel, but unlocking the hood and urging the fixing tab of the hood to move outwardly and leave from the opening in a direction perpendicular to the panel when said actuating arm is rotated away from said panel.

16. The enclosure as described in claim 15, wherein said means includes a protrusion cooperating with a fixing hole in the fixing tab to lock the hood in position.

17. The enclosure as described in claim 15, wherein said means includes an ejector cooperating with a bend of the fixing tab to eject the fixing tab out of the opening.

* * * * *